Oct. 17, 1939.  E. H. PYLE ET AL  2,176,471
CONTROLLING APPARATUS
Filed March 13, 1936
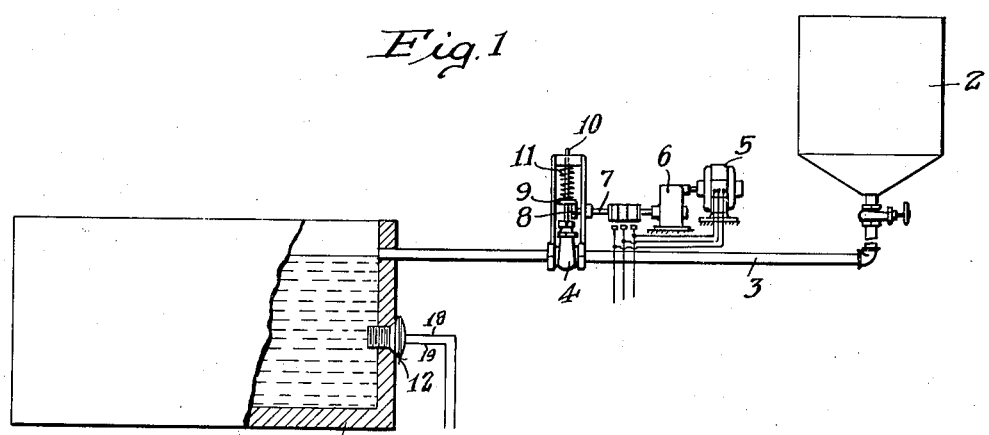
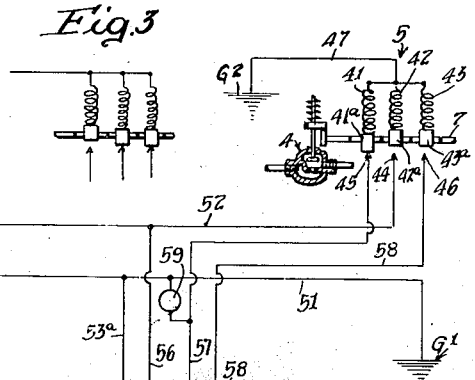
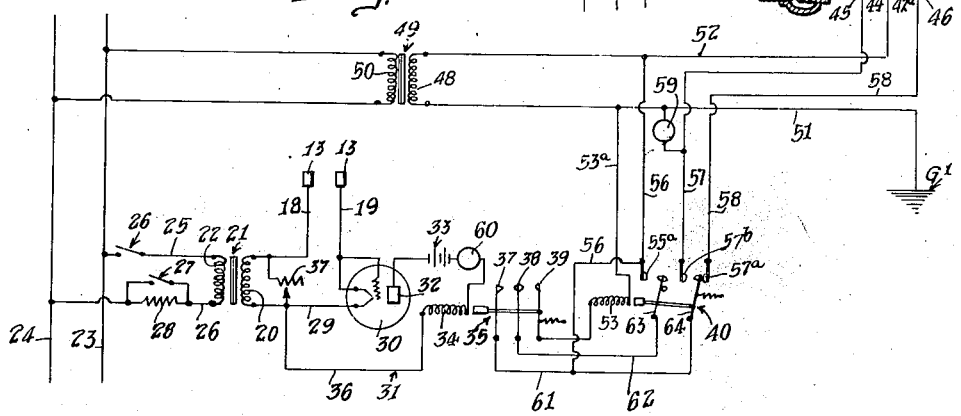
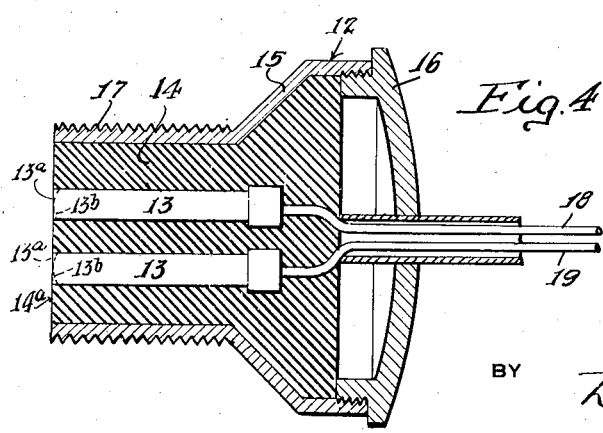
INVENTORS
Edward H. Pyle
Thomas Earl Ross
BY Lyon & Lyon
ATTORNEYS Patented Oct. 17, 1939

2,176,471

UNITED STATES PATENT OFFICE 2,176,471

CONTROLLING APPARATUS

Edward H. Pyle, Oakland, and Thomas Earl Ross, Berkeley, Calif., assignors to California Packing Corporation, San Francisco, Calif., a corporation of New York Application March 13, 1936, Serial No. 68,738

2 Claims. (Cl. 175—183)

This invention relates to controlling apparatus for controlling the composition of a fluid substance, and while the invention is capable of use in many situations for effecting this general purpose, it is intended to be used particularly for controlling the degree of concentration of liquids such as salt and lye solutions employed in fruit peeling apparatus. Heretofore the degree of concentration of an element in a fluid or liquid has been ascertained by passing an electric current between terminals immersed in the fluid or liquid, and by indicating and observing the variations in the resistances that the liquid affords to the passage of the current between the terminals; and such indications have been used as a guide in controlling the degree of concentration. However, such apparatus and the methods employed with it are inaccurate, and involve the "personal equation" of the man controlling the addition of the supply liquid or element that controls the degree of concentration of the liquid. Such apparatus and method of manually controlling lye peeling apparatus for peeling fruit, is highly objectionable because the amount of lye used is determined almost entirely by the judgment of the operator of the peeling tank, and the tendency is for the operator to keep the solution stronger than necessary for peeling purposes, which reduces the quality of the peeled fruits or vegetables, and also increases the lye consumption, thereby adding to the production cost. On the other hand, if the operator allows the lye solution to become too weak, the fruits or vegetables are improperly or partially peeled, making it necessary to sort the fruit after being peeled in the peeler, to enable the improperly peeled fruit to be trimmed and properly peeled by hand. This results in reducing the grades or quality, or discarding some fruit as waste.

The general object of this invention is to provide simple apparatus for controlling the degree of concentration of a fluid or liquid used for any purpose, so that a desired degree of concentration may be maintained automatically.

We are aware that variations in an electric current passed between terminals immersed in a liquid, have been employed to control automatic means for changing the degree of concentration of the liquid, but in such apparatus the same current and current voltage is employed for actuating the relay switches or other instruments that must be employed to bring into action the regulating means. As such a current must have sufficient driving voltage to operate the electrical controlling apparatus, the variations in it due to changes in the degree of concentration in the liquid, are slight. Hence such apparatus is not accurate or sensitive. One of the objects of this invention is to provide apparatus for this purpose, which will be extremely sensitive, and which will enable the degree of concentration to be controlled within very narrow limits.

The terminals which, heretofore, have been employed in the tanks or liquid containers, have generally projected to a considerable distance beyond the electrode carrier or insulation, and due to electrolytic action these terminals or electrodes are subject to considerable erosion on their side faces, the effect of which is that they will vary considerably in their conductivity at the points where the current passes between them. In other words, due to this erosive effect, the resistance to the passage of the current through the liquid at the electrodes cannot be accurately indicated by variations in the current. One of the objects of this invention is to provide a construction for the terminals or electrodes, which will overcome this defect; in other words, to provide electrodes which, even after considerable use, will still operate substantially as effectively as when the electrodes were first put into use.

Further objects of the invention will appear hereinafter.

The invention consists in the novel parts and combination of parts to be described hereinafter, all of which contribute to produce an efficient controlling apparatus.

A preferred embodiment of the invention is described in the following specification, while the broad scope of the invention is pointed out in the appended claims.

In the drawing:

Figure 1 is a diagrammatic side elevation and partial section illustrating apparatus embodying our invention.

Figure 2 is a diagrammatic view indicating the supply means for supplying a controlling liquid to the tank, and illustrating the motor field coils diagrammatically, together with all of the wiring of the apparatus. This view indicates the valve in its open position, and indicates the motor contacts in the relation which they have when the motor is at rest after opening the valve.

Figure 3 is a diagrammatic view indicating the field coils of the motor, and indicating the relation of the motor contacts as they exist when the motor is operated to close the valve.

Figure 4 is a vertical section through a plug that carries electrodes immersed in the fluid or liquid, and indicating a preferred construction for the same.

Before proceeding to a more detailed description of the invention, it should be stated that in accordance with our invention, we provide a container, for example, a peeling tank, which carries a liquid such as a lye solution, and we provide means for supplying a liquid to this tank either to increase the concentration of the lye or to reduce the same. We also provide terminals or electrodes immersed within the liquid, and between these terminals we prefer to pass a relatively weak electric current. As the degree of concentration of the lye varies in the tank, this relatively weak current will vary considerably due to the change in resistance of the liquid. These slight variations are amplified, and through the agency of the amplified current we control the automatic means for admitting or cutting off the flow of the liquid to the tank. On account of the fact that the current flowing between the electrodes is a very weak current, it will be evident that slight variations in the resistance of the liquid will produce very great variations in the electric current. Hence when this current is amplified, an electric current is developed that varies very considerably with the degree of concentration of the liquid. This makes the apparatus very sensitive to changes in the liquid, and facilitates a very nice control of the liquid in the tank.

In the circuit between the electrodes, we reduce the resistance to a minimum by the use of conductors or wires of ample size. By eliminating outside resistances in this way, and employing a relatively weak current, it will be evident that slight changes in the resistance of the liquid will produce very great variations in the strength or amperage of the current flowing in the sensitive circuit that passes through the electrodes. By providing an adjustable resistance associated with this circuit, the apparatus can be readily adapted for different concentrations of the solution of lye or other substance. Under laboratory tests this controlling apparatus has been shown to be such that a .2% change in solution strength, will suffice to bring about an operation of the automatic controls. In ordinary commercial practice it is usually sufficient to provide for a control to a margin of .20% to .25%.

Referring more particularly to the parts, 1 indicates a container; for example, a tank for carrying a solution of any kind, such as a salt solution or a lye solution such as employed in fruit-peeling apparatus. In the apparatus as illustrated, we provide a supply tank 2 for supplying concentrated lye solution to the tank through a supply pipe 3. Associated with the supply pipe, we provide means for automatically controlling the admission of concentrated lye solution from the tank 2. For this purpose we prefer to provide the supply pipe with an automatically controlled valve 4, which is adapted to be held closed or open by automatic means including an electric motor 5 which drives a reduction gear 6, said reduction gear operating to drive a cam shaft 7 through which the valve is controlled. In the present instance the means for controlling the valve from the cam shaft 7 is more or less diagrammatic for the purpose of illustrating the invention, and may involve the use of a cam 8 on which rides a collar 9 on the valve stem 10, the said stem being guided to move vertically through the valve bonnet, and a coil spring 11 being provided for keeping the collar 9 on the cam and for following up the cam to close the valve by the spring pressure.

At any suitable point, preferably in the side of the tank, we mount a plug 12 carrying terminals or electrodes 13 (see Fig. 4), which electrodes are preferably mounted in an insulating carrier 14, which is secured in the plug. In the present instance the plug includes a metallic shell 15 in which the insulating carrier 14 is mounted and secured in place by a screw cap 16. The inner portion of the shell 15 is provided with screw threads 17 for screwing the plug into the wall of the tank. The electrodes 13 are connected respectively, to insulated circuit wires 18 and 19, the former of which is connected with a secondary coil 20 of a transformer 21, the primary coil 22 of which is connected between conductors 23 and 24 supplying alternating current from a commercial circuit. The connecting wires 25 and 26 for this circuit preferably include a main switch 26 and an auxiliary switch 27, which is wired in parallel with a resistance 28, which can be changed as desired to control the action of the current in the primary coil 22.

The other end of the secondary coil 20 is connected by a conductor 29 to a thermionic tube 30, having means for heating its cathode. In the present instance we have illustrated a thermionic tube having a filament which is connected in circuit by the conductor 19, thereby establishing an electrode circuit through the secondary coil 20 and the conductor 29. This thermionic tube operates as amplifying means for the current flowing into the tube through the conductors 19 and 29, and develops an amplified current in the associated circuit 31, which passes to the plate 32 of the tube, and which includes a battery 33 and the solenoid coil 34 of a relay switch 35. The conductor 36 connects one end of the solenoid coil 34 to the conductor 29; and wired parallel with the secondary coil 20 we provide a variable resistance 37 between the wires 18 and 29. By altering this resistance 37 the strength of the current flowing between the electrodes 13 can be controlled as desired. When the relay switch 35 is energized, it pulls together three contacts 37, 38 and 39, which are normally separated from each other, and this switch controls a motor switch 40 for controlling the branch circuits that operate the motor 5. This motor switch 40 has two positions, in both of which it can pass current to the motor. One of these positions of the switch 40 corresponds to an open position of the valve, and the other position corresponds to a closed position of the valve. The motor is preferably a unidirectional shaded pole induction motor, and has three field coils 41, 42 and 43. The flow of current through these coils is controlled by cams 41a, 42a and 43a, on the cam shaft 7, said cams operating so that when the motor is at rest, the cam 42a leaves the branch circuit through the coil 42 open at the contact 44; but the cam 42a is so constructed that immediately when the motor starts, the contact 44 will be engaged to close a branch circuit through the coil 42. At the open position of the valve, the cam 41a closes the branch circuit through the coil 41 at contact 45, but leaves the branch circuit through the coil 43 open at the contact 46.

The ends of the coils 41, 42 and 43 are connected in parallel to a ground conductor 47 that is grounded at $G^2$. The driving circuit for the motor is a grounded circuit leading from the ground $G'$ through the secondary coil 48 of a transformer 49, the primary 50 of which is connected up to the service wires 23 and 24. The conductor 51 from the ground G' is connected to one end of the coil 48, and the conductor 52 connected to the other end of the secondary coil 48, is connected to the contact 44 that is normally open; that is to say, open when the motor is at rest.

The motor switch 40 includes a solenoid coil 53, one end of which is connected to the contact 39, the other end of which is connected by a wire 53a to the conductor 51. The contact 55a is connected by wire 56 to conductor 52. Coil 53 is a high resistance coil.

The motor switch 40 also includes a pair or set of contacts 57a and 57b, the latter of which is connected by wire 57 to contact 45, and the former of which is connected by a conductor 58 to the contact 46. Between the conductors 51 and 57 a motor valve pilot light 59 may be provided to indicate whether the valve is opened or closed.

In the sensitive circuit 31 a milliameter 60 may be provided.

The movable contacts 37 and 38 are connected by conductors 61 and 62 respectively, with the movable switch members 63 and 64 of the motor switch 40, and the conductor 61 is connected by the aforesaid circuit wire 56 with the conductor 52 already referred to.

In the operation of the apparatus described, assuming for example, that the valve 4 is to control the admission of concentrated lye solution, the valve being open as shown in Fig. 2. Under these conditions the concentration of the solution will be gradually increasing in the tank, and as the concentration increases, the resistance of the liquid between the electrodes diminishes so that the current in the sensitive circuit 31 will gradually increase. When the amplified current developed by the thermionic tube from the current flowing between the terminals 13, 13 is sufficient, the solenoid coil 34 will become more energized, thereby closing the relay switch 35 and bringing the contacts 39, 38 together first and later pulling them against the contact 37. This will close a metallic circuit from the conductor 51 down through conductor 53a, coil 53, contact 39, contact 38, contact 37, conductor 61, and conductor 56 to the conductor 52, which circuit is energized by the secondary coil 48 of the transformer 49. This will energize the coil 53 and immediately pull the movable switch members 63 and 64 over to their opposite position in which they will engage respectively with contacts 55a and 57b. Moving this switch 40 to its left-hand position in this way, will close a starting circuit through the motor as follows:

From the ground G² through conductor 47 coil 41 wire 57 contact 57b, movable contact 64, wire 61, 56, 52 transformer coil 48 wire 51 to ground G'. This will start the motor, and as soon as the motor starts, the cam 42a will close the circuit through coil 42 and contact 44. As the cam shaft 7 turns, it will open the branch circuit through the field coil 41 and close the connection through the conductor 58 and field coil 43 at the contact 46; but this will not put this coil into the circuit because at this time the movable contact 64 is out of contact with the fixed contact 57a. As the motor rotates further, the cam 42a will eventually open the circuit through the coil 42 at the contact 44, as illustrated in Fig. 3. This will stop the motor after the cam shaft 7 has made a half turn, and in this position of the motor the spring 11 will have closed the valve. However, the circuit through the solenoid coil 53 will be maintained so that the motor switch 40 will remain in its left-hand position until the concentration of lye in the tank 1, falls to its lower limit; and when this occurs the return spring 35a for the switch 35 will open the contacts 37, 38 and 39 and the return spring 40a will move switch 40 into the position shown in Fig. 2. At this time the branch circuits through the field coils 41 and 42 will be open at their cams 41a, 42a, but the branch circuit through the field coil 43 will be closed at the contact 46. Hence when the switch 40 moves over to the right-hand position, a ground circuit will be established as follows:

From the ground G' through conductor 51, secondary coil 48 of the transformer 49, conductor 52, conductor 56, conductor 61, movable contact 64, contact 57a, conductor 58, contact 46, and coil 43 to the ground G². This will start up the motor, close the branch circuit through the field coil 41 at the contact 45, close branch circuit through the field coil 42, and later open the branch circuit through the field coil 43, and the motor will rotate sufficiently to rotate the cam shaft 7 through a half turn to reopen the valve. As the rotation of the cam shaft approaches the end of its half turn, the cam 42a will open the branch circuit through the field coil 42, leaving the parts in the relation in which they are illustrated in Fig. 2. This completes the cycle of operation of the apparatus.

Referring to Fig. 4, we prefer to construct the plug carrying the electrodes 13, 13 so that the faces 13a of the terminals are substantially flush with the end face 14a of the insulation 14. The result of this is that when corrosion of the electrodes takes place, their end faces will assume the convex form indicated by the dotted lines 13b. In other words, the end faces will have a convex form. By reason of the erosion at the ends of the electrodes, the distance between them will, of course, be slightly increased, but this is substantially compensated for by the convex form which the ends of the electrodes take, which increases their area and also due to the convexity, tends to increase the flow of current between them.

If it is desired to use a diluting liquid instead of a concentration liquid for controlling the concentration in the tank, this can be accomplished by merely operating the valve through a lever actuated by the valve cam so that the action of the valve is reversed, or the operation can be reversed by merely reversing the wires 57b and 58 at their attachment to the contacts 55b and 57a.

By the use of the three contacts 37, 38 and 39 the sparking effects are reduced when the circuits through them are broken, and they give a steadier operation of the apparatus by preventing the motor from being constantly thrown in and out of circuit.

It is understood that the embodiment of the invention described herein is only one of the many embodiments this invention may take, and we do not wish to be limited in the practice of the invention, nor in the claims, to the particular embodiment set forth.

What we claim is:

1. In apparatus for determining the composition of a fluid, the combination of a pair of electrodes within the fluid, a thermionic vacuum tube having a cathode adapted to be electrically heated and having an anode, a source of potential for said cathode, said source of potential having internal impedance whereby its potential drops in response to increased current demand thereon, means connecting said source of potential, said electrodes and said cathode in series; an adjustable impedance connected in shunt to said source of potential and having an impedance of the same order of magnitude as said internal impedance, for adjusting said potentials, a current responsive device, a source of anode potential for said tube, and circuit means connecting said current responsive device and said source of anode potential in series between the cathode and anode of said tube.

2. In apparatus for determining the composition of a fluid, the combination of a pair of electrodes within the fluid, a current-measuring device, a source of potential having internal impedance whereby its potential drops in response to increased current demand thereon, means connecting said source of potential, said electrodes and said current measuring device in series, and an adjustable impedance element having impedance of the same order of magnitude as said internal impedance connected in shunt to said source of potential for varying the potential applied to said electrodes and current measuring device and simultaneously reducing the total impedance of the series circuit.

EDWARD H. PYLE.
THOMAS EARL ROSS.